US012057671B2

(12) United States Patent
Liu et al.

(10) Patent No.: US 12,057,671 B2
(45) Date of Patent: Aug. 6, 2024

(54) PORT PROCESSING METHOD FOR ESD AND EOS PROTECTION

(71) Applicant: AMLOGIC (SHANGHAI) CO., LTD., Shanghai (CN)

(72) Inventors: Yong Liu, Shanghai (CN); Kun Zhang, Shanghai (CN); Minjun Huang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 465 days.

(21) Appl. No.: 17/599,730

(22) PCT Filed: Nov. 8, 2019

(86) PCT No.: PCT/CN2019/116841

§ 371 (c)(1),
(2) Date: Sep. 29, 2021

(87) PCT Pub. No.: WO2020/207005

PCT Pub. Date: Oct. 15, 2020

(65) Prior Publication Data

US 2022/0173564 A1 Jun. 2, 2022

(30) Foreign Application Priority Data

Apr. 9, 2019 (CN) ......................... 201910282263.9

(51) Int. Cl.

| | |
|---|---|
| ***H01R 43/00*** | (2006.01) |
| ***H01R 13/02*** | (2006.01) |
| ***H01R 13/26*** | (2006.01) |
| ***H01R 13/648*** | (2006.01) |

(52) U.S. Cl.
CPC ............. *H01R 43/00* (2013.01); *H01R 13/02* (2013.01); *H01R 13/26* (2013.01); *H01R 13/6485* (2013.01)

(58) Field of Classification Search
CPC ........ H01R 43/00; H01R 13/02; H01R 13/26; H01R 13/6485; H01R 13/648; H05F 3/04
See application file for complete search history.

(56) References Cited

U.S. PATENT DOCUMENTS 11,552,431 B2 * 1/2023 Lee .................... H01R 13/6485
11,870,190 B2 * 1/2024 Hopkinson ............ H01R 13/03
2012/0252270 A1 * 10/2012 Lee .................... H01R 12/7088
439/607.01
2014/0063678 A1 * 3/2014 Yoo ..................... G06F 13/4081
361/220

* cited by examiner

*Primary Examiner* — Travis S Chambers
(74) *Attorney, Agent, or Firm* — Clement Cheng

(57) ABSTRACT

A port processing method, used to enhance an electrostatic discharge protection capability and an overstress protection capability. The method comprises: step S1, providing a cable having a plurality of terminal contact cores leading out of the cable, the plurality of terminal contact cores comprising contact cores disposed at two sides of the cable, and signal cores disposed within the cable; and S2, changing the signal layout of the contact cores and the signal cores, so as to enhance the electrostatic discharge protection capability and the overstress protection capability. The method for changing the signal layout comprises: using the contact cores as a signal ground, and disposing a contact spring plate at a middle portion of each of the contact cores and each of the signal cores; and extending lengths of the contact cores outward.

4 Claims, 5 Drawing Sheets

S1, providing a cable having a plurality of terminal contact cores leading out of the cable, the plurality of terminal contact cores comprise contact cores disposed at two sides of the cable, and signal cores disposed within the cable;

↓

S2, changing the signal layout of the contact cores and the signal cores, so as to enhance the electrostatic discharge protection capability and the overstress protection capability.

Figure 2

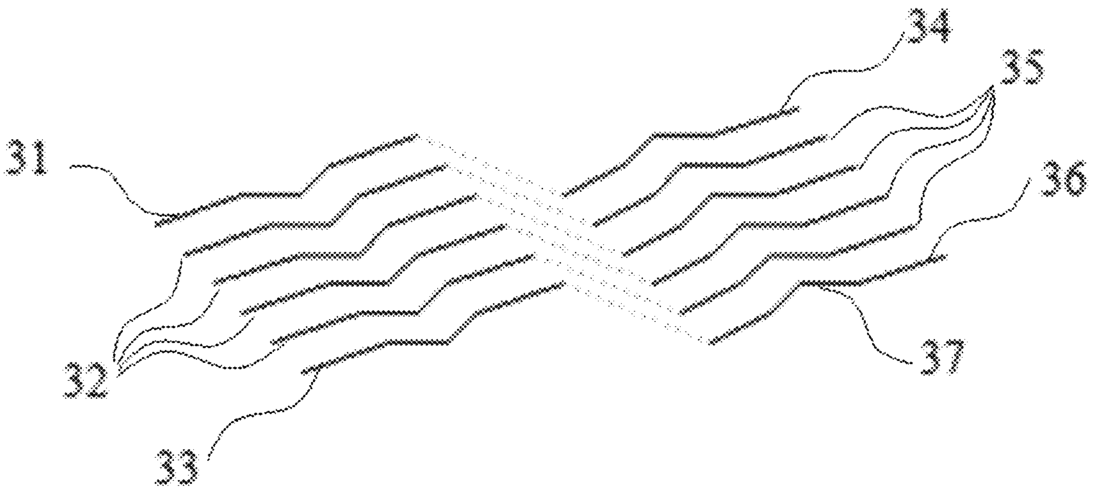

Figure 3

PORT PROCESSING METHOD FOR ESD AND EOS PROTECTION

BACKGROUND OF THE INVENTION

1. Field of the Invention

The invention relates to the technical field of electrostatic protection and overvoltage protection, in particular to a port processing method.

2. Description of the Related Art

With the development of electronic products, ESD (Electrostatic Discharge)/ESD (Electrical Overstress) occurred on the electronics is a major concern for those in this industry. Many product manufacturers and chip solution manufacturers are working hard to solve the ESD/EOS issue caused by external factors. For example, when a human body contacts the port of the electronic product, electrostatic current will generate, and a short-term overvoltage or overcurrent phenomenon will occur when the contact is not made through the device, leading to ESD/EOS issue. EOS issue is quite common in consumer electronics, and damage from this EOS issue is also very serious, which may damage CPU pins and they may be rendered useless, or may completely damage a certain module of the CPU and cause the entire system to fail to work. The TV series, set-top box series and speaker series products used have similar problems, and this problem may even has become a bottleneck for customer after-sales quality.

In order to solve this problem, a solution commonly used in this industry is to increase the ESD protection on the chip side or to solve this problem in PCB circuits or traces. For example, the protection measures on the chip side comprise setting a built-in ESD device on the chip side or improving the isolation design of the photodiode, etc. For the protection in areas external to the chip, hollowing of wires needs to be avoided when wiring, wires should be covered by ground to the greatest extend, or external ESD devices are added, and other measures. These methods can solve the EOS problem of the port. Especially in the case of adding ESD devices and increasing line impedance characteristics, it can further optimize the damage caused by the external EOS, so as to ensure that the CPU current and voltage at the chip are normal. However, another consideration which should be taken into account is cost. Cost is linearly increased after a series of ESD protection measures are added, which may in turn bring rising costs in this industry.

In the prior art, many more interfaces in the port of CPU (Central Processing Unit) contact the outside, such as HDMI (High Definition Multimedia Interface), USB (Universal Serial Bus) and internal WIFI, BT, LED, etc. There are many types of corresponding terminal forms. When the connecting wire is in contact with the port, the current connecting wire has the following two problems: (1) when they are connected, the contact between the wire core and the terminal core is not the first contact, but there may be a situation where the terminal shell and the wire ends are in preferential contact, as shown in FIG. 1*a*, T1, T2, T3, T4, T5, T6 indicate wire cores contacted by the terminals. At present, the more traditional way to create an interface is to ground GND of the wire core in a middle position, i.e., at T2 and T5 positions, or one end is grounded GND, that is, GND is at one end T1, T6 positions or one end of GND is at T3, T4 positions; (2) when cables are in contact with each other up and down instead of left and right, the joint where terminals connect with each other may first contact T4, T5 position of the middle wire core, which may also lead to abnormal EOS or ESD issues in which terminals contact occur, or since male seat and female seat of the voltage do not properly engage with each other when cables are contacted up and down, some wire cores may short circuited.

In particular, with reference to FIGS. 1*a*, 1*b*, T1, T2, T3, T4, T5 and T6 represent wire cores. FIG. 1*a* is a plan view. When the two of above-mentioned wire cores are in contact with each other, issues regarding contact between two wire cores left and right, up and down may occur. T1, T6 and T3, T4 are defined as specific signals in the general design of wire cores, or defined as power, for example, T1, T6 are defined as power source 3V3, T3, T4 are defined as GND. In the case where it contacts 3V3 first, then GND, voltage of the signal wire core appears to be abnormal, and EOS issue arises; alternatively, in the case where wire cores are not aligned with each other, contact of the signal wire core comes before the contact of GND. However, if two adjacent wire cores are designed to be very close to each other, signal mixing may occur. When the two adjacent wire cores are GND and the signal, EOS issue on signal may occur.

SUMMARY OF THE INVENTION

Given that the foregoing problems exist in the prior art, the present invention provides a port processing method.

The technical solution is shown as follows:

port processing method for enhancing an electrostatic discharge protection capability and an overstress protection capability, comprising the steps of:

S1, providing a cable having a plurality of terminal contact cores leading out of the cable, the plurality of terminal contact cores comprise contact cores disposed at two sides of the cable and signal cores disposed within the cable; and S2, changing the signal layout of the contact cores and the signal cores, so as to enhance the electrostatic discharge protection capability and the overstress protection capability.

Preferably, in S1, at least three contact cores are disposed. Preferably, in S2, the method for changing the signal layout of the terminal contact cores comprises, using the contact cores as a signal ground, and disposing a contact elastic piece in a central portion of each of the contact cores and of each of the signal cores respectively, to enhance the electrostatic discharge protection capability and the overstress protection capability.

Preferably, the height of the contact elastic piece disposed on the contact cores is greater than that of the contact elastic piece disposed on the signal cores, and is at least greater than a preset height.

Preferably, in S2, the method for changing the signal layout of the signal cores comprises, extending the length of each of the contact cores outwards, so that the length of each of the contact cores is greater than that of each of the signal cores, to enhance the electrostatic discharge protection capability and the overstress protection capability.

Preferably, in S2, the method for changing the signal layout of the terminal contact cores comprises adjusting a signal spacing between each of the contact cores and each of the signal cores adjacent thereto, to enhance the electrostatic discharge protection capability and the overstress protection capability.

Preferably, the signal spacing between each of the contact cores and each of the signal cores adjacent thereto is at least greater than a preset width.

By adopting the above-mentioned technical solutions, the present invention has the beneficial effects that a port processing method is provided. By using the method, the extra cost is not needed, the signal layout of the contact cores and the signal cores is changed to enhance the electrostatic discharge protection capability and the overstress protection capability, the operation is simple, and the cost is low.

BRIEF DESCRIPTION OF THE DRAWINGS

The accompanying drawings, together with the specification, illustrate exemplary embodiments of the present disclosure, and, together with the description, serve to explain the principles of the present invention.

FIG. 2 is a flowchart showing steps of a port processing method according to an embodiment of the present invention;

FIG. 3 is a schematic diagram showing a first embodiment of a structure of a terminal contact core in a top view according to an embodiment of the present invention;

DETAILED DESCRIPTION

Figure 1A:
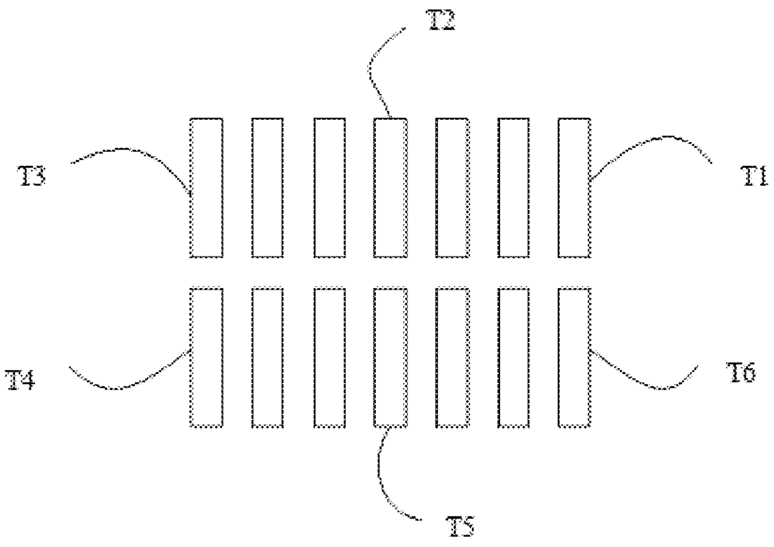
Figure 1a Prior Art
FIG. 1*a* is a schematic diagram showing a structure of a core in the prior art in a top view.
Figure 1B:
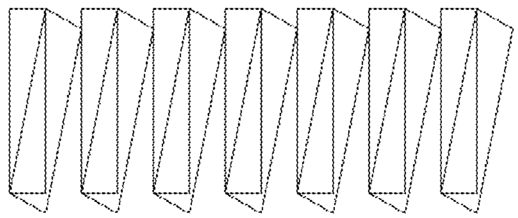
Figure 1b Prior Art
FIG. 1*b* is a schematic diagram showing an overall structure of the core in the prior art.

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner.

The present invention will be described hereinafter with reference to the accompanying drawings and particular embodiments, but the invention is not limited thereto.

In the prior art, when it comes to the cause for EOS/ESD, three elements are key drivers for EOS/ESD damage, namely, interference sources, propagation paths, and damaged devices; as the cause of EOS/ESD damage is known, the proposed ways to avoid EOS/ESD damage is to: cut off the EOS/ESD interference source, cut off the propagation path, and isolate the damages devices.

Thus, given that the foregoing problems exist in the prior art, the present invention provides a port processing method for enhancing the electrostatic discharge protection capability and the overstress protection capability, as shown in FIG. 2, the method comprising the steps of:

S1, providing a cable having a plurality of terminal contact cores leading out of the cable, the plurality of terminal contact cores comprise contact cores disposed at two sides of the cable, and signal cores disposed within the cable; and S2, changing the signal layout of the contact cores and the signal cores, so as to enhance the electrostatic discharge protection capability and the overstress protection capability.

The technical solution of the port processing method is adopted to enhance the electrostatic discharge protection capability and the overstress protection capability, as shown in FIG. 3. In FIG. 3, at least three contact cores are disposed, and the contact cores are indicated as 31, 33, 36, and 37; while the number of the signal cores is not limited, there are 8 signal cores in FIG. 3, and they are indicated as 32 and 35. Changing the signal layout of the contact cores and the signal cores, i.e., changing the signal layout of the terminal contact cores, to enhance the electrostatic discharge protection capability and the overstress protection capability.

Furthermore, in this technical solution, the previous ESD/EOS protection devices are discarded; instead, the propagation path is considered as a way to avoid the ESD/EOS damage, that is to say, the propagation path is cut off, and the connection of the ground GND is prioritized when two devices are in contact; in addition, GND of PCB board is cut, so that energy of charge reaching the chip end is the lowest, and desired protection is achieved. In particular, when two devices or electronic products or cables and devices or charged objects touch the electronic products, the GND is grounded on a priority basis, so that the potential difference is reduced, allowing both devices to have the same reference potential plane when the signals are superimposed, thus, the EOS problem of overvoltage and overcurrent will not occur when the signals are in contact.

In a preferred embodiment, in S2, the method for changing the signal layout of the terminal contact cores comprises, using the contact cores as a signal ground, and disposing a contact elastic piece in a central portion of each of the contact cores and of each of the signal cores respectively, to enhance the electrostatic discharge protection capability and the overstress protection capability.

In particular, as shown in FIG. 3, the method for changing the signal layout of the terminal contact cores comprises, using the contact cores as the signal ground, indicated as 31,33, 34, and 36 in FIG. 3; the signal cores in FIG. 3 are indicated as 32 and 35. A contact elastic piece is arranged in a central portion of each of the contact cores and of each of the signal cores. The contact elastic piece is a protruding structure indicated as 37 in FIG. 3. When a male connector and a female connector are in contact with each other, the protruding contact elastic pieces thereof will be pressed against each other, and GND in the contact cores may form anti-interference to the core signals; when the signal cores are pulled out, the elastic pieces at the socket bounce off first, and GND then is still connected, so that the level of the signal lines does not appear abnormal, and protection-related EOS issue can be synchronized.

In the above-mentioned technical solution, the height of the contact elastic piece disposed on the contact cores is greater than that of the contact elastic piece disposed on the signal cores, and is at least greater than a preset height, wherein the preset height is 10 mil.

Figure 4:
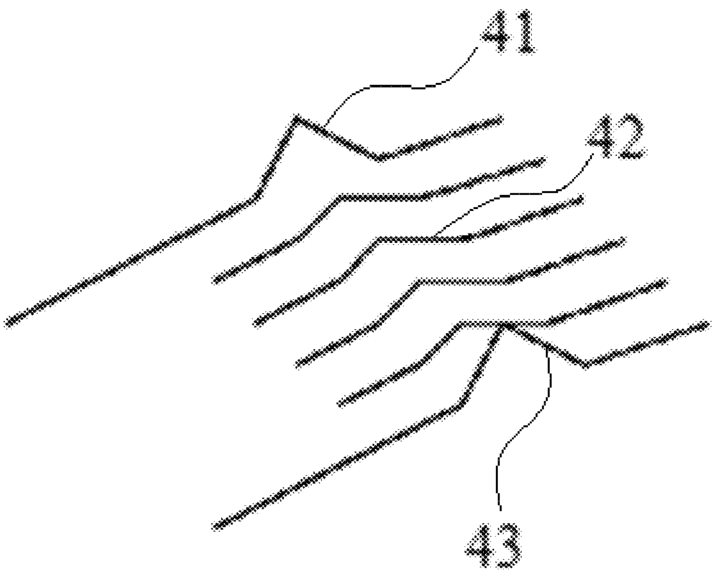
FIG. 4 is a schematic diagram showing a second embodiment of a structure of a terminal contact core according to an embodiment of the present invention.

In particular, as shown in FIG. 4, the contact elastic piece is indicated as 41. The height of the contact elastic piece of the contact cores is greater than that of the contact elastic piece of the signal cores. For example, the contact elastic piece 41 is higher than the contact elastic piece 42; in the meantime, the core of the contact elastic piece 41 is extended, and the core of the contact elastic piece 43 is also extended. In this way, it can be guaranteed that the core of the contact elastic piece 41 and the core of the contact elastic piece 43 are connected first when the contact elastic pieces are in contact with each other, and that the signal core of the contact elastic piece 42 is surrounded by GND. The height of the core of the contact elastic piece 41 and the core of the contact elastic piece 43 is at least 10 mil greater than that of the core of the contact elastic piece 42. The purpose is to correct the deviation caused when the terminals move up and down, so that misoperation can be avoided, and related EOS issue can be further protected.

Of note, the preset height defined in the solution is 10 mil, however, other heights are also contemplated. Details will not be repeated herein.

In a preferred embodiment, in S2, a method for changing the signal layout of the signal cores comprises, extending the length of each of the contact cores outwards, so that the length of each of the contact cores is greater than that of each of the signal cores to enhance the electrostatic discharge protection capability and the overstress protection capability.

Figure 5:
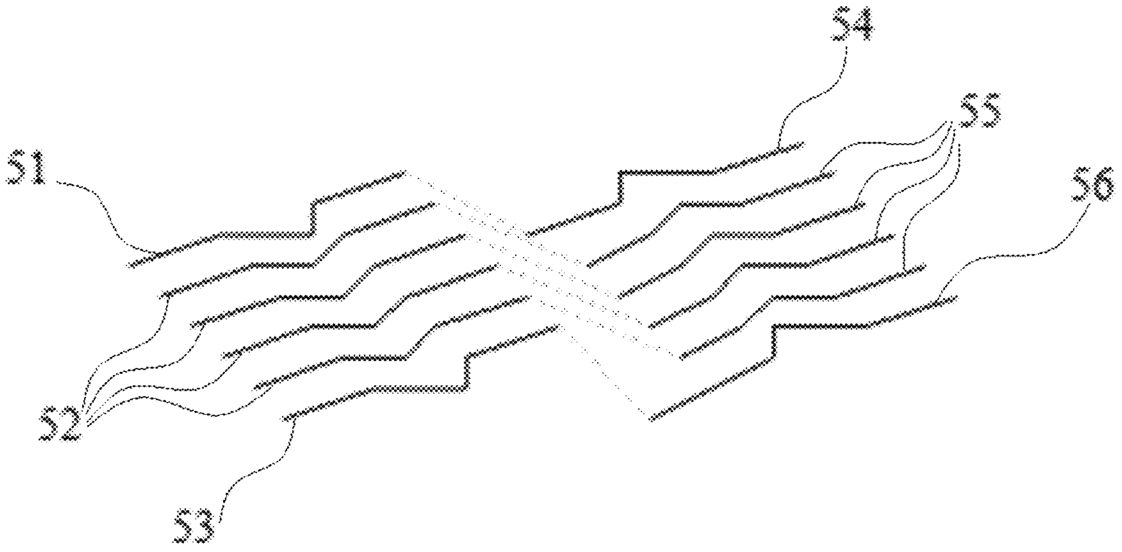
FIG. 5 is a schematic diagram showing a third embodiment of a structure of a terminal contact core according to an embodiment of the present invention.

In particular, as shown in FIG. 5, the contact cores 54 and 56, 51 and 53 are dynamically extended respectively, so that the length of these contact cores is greater than that of other signal cores 52 and 55. Thus, the contact cores 54 and 56, 51 and 53 are prioritized to be connected when two ports are in contact with each other, and related EOS issue can be further protected.

Figure 6:
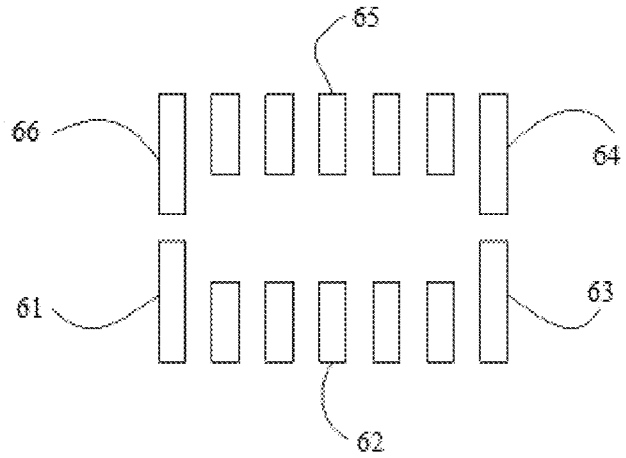
FIG. 6 is a schematic diagram showing a third embodiment of a structure of a terminal contact core in a top view according to an embodiment of the present invention.
Figure 7:
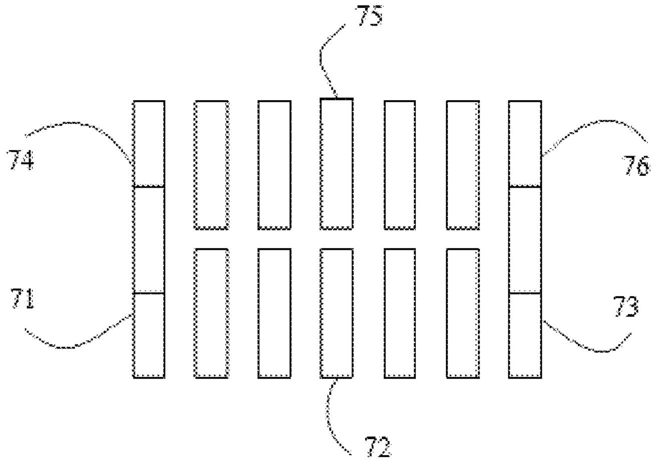
FIG. 7 is a schematic diagram in which a port of a third embodiment of a structure of a terminal contact core according to an embodiment of the present invention is contacted.

Furthermore, as shown in FIGS. 6 and 7, the contact cores 61 and 63, 64 and 66 are dynamically extended respectively, so that the length of these contact cores is greater than that of other signal cores 62 and 65. Thus, the contact cores 6 land 63, 64 and 66 are prioritized to be connected when two ports are in contact with each other, and related EOS issue can be further protected.

Figure 8:
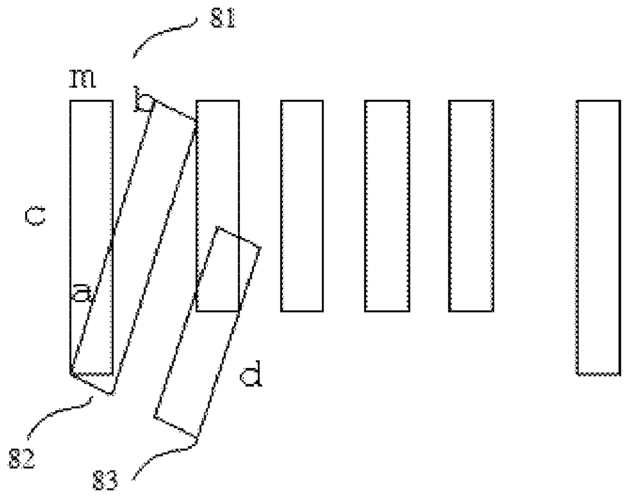
FIG. 8 is a schematic diagram of a third embodiment of a computing signal core of a terminal contact core according to an embodiment of the present invention.

Furthermore, as shown in FIG. 8, the core has a width of m, and the distance between the contact core 82 and the signal core 83 is b, the contact core 82 has a length of C, the signal core 83 has a length of d. Based on those conditions, it can be known that the length d of the signal core 83 (the lowest length) can be obtained by using the following formula:

$$\cot \grave{a}(m+b)+((m+b)-(m+b)/\cos \grave{a})/\sin \grave{a}$$

Furthermore, the signal layout of the contact cores and the signal cores is changed to enhance the electrostatic discharge protection capability and the overstress protection capability, the operation is simple, and the cost is low.

In a preferred embodiment, in S2, a method for changing the signal layout of the terminal contact cores comprises, adjusting a signal spacing between each of the contact cores and each of the signal cores adjacent thereto, to enhance the electrostatic discharge protection capability and the overstress protection capability.

In the above-mentioned technical solution, the signal spacing between each of the contact cores and each of the signal cores adjacent thereto is at least greater than a preset width, wherein the preset width is 10 mil.

Figure 9:
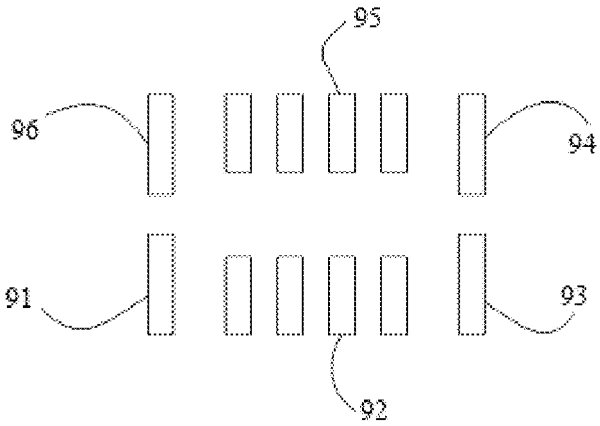
FIG. 9 is a schematic diagram of a fourth embodiment of a terminal contact core according to an embodiment of the present invention.

In particular, as shown in FIG. 9, large signal interference occurs when the GND signal is very close to the signal. Particularly when ESD occurs in an environment, the parasitic capacitance between the GND and the signal triggers the voltage limit of the signal. the defined value of the core pairs at both sides with respect to the adjacent centers is greater than 10 mil. That is, the signal spacings between the contact core 91, the contact core 93 and the contact core 92 respectively are at least 10 mil, and the signal spacings between the contact core 94, the contact core 96 and the contact core 95 respectively are at least 10 mil. A suitable signal spacing is set so that the electrostatic discharge protection capability and the overstress protection capability are enhanced.

Of note, the preset width defined in this solution is at least greater than 10 mil, however, the increase in the signal spacing is not defined. Details in this regard will not be repeated.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A port processing method for ESD and EOS protection, enhancing an electrostatic discharge protection capability and an overstress protection capability, comprising the steps of:

S1, providing a cable having a plurality of terminal contact cores leading out of the cable, the plurality of terminal contact cores comprise contact cores disposed at two sides of the cable, and signal cores disposed within the cable; and S2, changing the signal layout of the contact cores and the signal cores by using the contact cores as a signal ground, and disposing a contact elastic piece in a central portion of each of the contact cores and of each of the signal cores respectively, the contact elastic piece is a protruding structure, wherein the height of the contact elastic piece disposed on the contact cores is greater than that of the contact elastic piece disposed on the signal cores.

2. The port processing method of claim 1, wherein in S1, at least three contact cores are disposed.

3. The port processing method of claim 1, wherein in S2, the method for changing the signal layout of the signal cores comprises, extending the length of each of the contact cores outwards, so that the length of each of the contact cores is greater than that of each of the signal cores, to enhance the electrostatic discharge protection capability and the overstress the contact core has a width of m, and the distance between the contact core and the signal core is b, the contact core has a length of c, the signal core has a length of d, the length d of the signal core is obtained by using the following formula:

$$\cot \grave{a}(m+b)+((m+b)-(m+b)/\cos \grave{a})/\sin \grave{a}.$$

4. The port processing method of claim 1, wherein in S2, the method for changing the signal layout of the terminal contact cores comprises, adjusting a signal spacing between each of the contact cores and each of the signal cores adjacent thereto.

* * * * *